US011985729B2

(12) United States Patent
Outler et al.

(10) Patent No.: US 11,985,729 B2
(45) Date of Patent: May 14, 2024

(54) SYSTEM AND PROCESS FOR SWITCHING SUBSCRIBER IDENTITY MODULE (SIM) CARDS

(71) Applicant: TracFone Wireless, Inc., Miami, FL (US)

(72) Inventors: Adam Outler, Miami, FL (US); Miguel Jardines Batista, Miami, FL (US); Mohsin Andha, Miami, FL (US)

(73) Assignee: Tracfone Wireless, Inc., Miami, FL (US)

( * ) Notice: Subject to any disclaimer, the term of this patent is extended or adjusted under 35 U.S.C. 154(b) by 0 days.

(21) Appl. No.: 17/368,086

(22) Filed: Jul. 6, 2021

(65) Prior Publication Data

US 2022/0007169 A1  Jan. 6, 2022

Related U.S. Application Data

(60) Provisional application No. 63/048,313, filed on Jul. 6, 2020.

(51) Int. Cl.
*H04W 8/18* (2009.01)

(52) U.S. Cl.
CPC ................... *H04W 8/18* (2013.01)

(58) Field of Classification Search
CPC ........................................ H04W 8/18
See application file for complete search history.

(56) References Cited

U.S. PATENT DOCUMENTS 8,554,276 B2 * 10/2013 Lin ............... H04B 1/3816
455/558

FOREIGN PATENT DOCUMENTS

| CN | 101656974 A | * | 2/2010 | |
|---|---|---|---|---|
| CN | 105792239 A | * | 7/2016 | |
| CN | 107548053 A | * | 1/2018 | |
| EP | 2244528 A1 | * | 10/2010 | ............... H04M 1/24 |
| WO | WO-2016145902 A1 | * | 9/2016 | ............... H04W 8/18 |

* cited by examiner

*Primary Examiner* — Keith Ferguson

(57) ABSTRACT

A wireless device component testing system and process includes implementation of a SIM switcher device. The SIM switcher device configured to connect to a wireless device, a computer system, and a plurality of SIM cards. The SIM switcher device is configured support testing of the plurality of SIM cards in conjunction with the wireless device, where the wireless device component testing system is configured to implement testing for the plurality of SIM cards, the wireless device, and a wireless network.

18 Claims, 5 Drawing Sheets

SYSTEM AND PROCESS FOR SWITCHING SUBSCRIBER IDENTITY MODULE (SIM) CARDS

CROSS-REFERENCE TO RELATED APPLICATIONS

This application claims the benefit of U.S. Provisional Application No. 63/048,313 filed on Jul. 6, 2020, which is hereby incorporated by reference in its entirety for all purposes as if fully set forth herein.

BACKGROUND OF THE DISCLOSURE

1. Field of the Disclosure

This disclosure relates generally to a system for switching subscriber identity module (SIM) cards. Moreover, this disclosure relates to a process for switching SIM cards. This disclosure further relates generally to a system for testing SIM cards and/or other wireless components. Moreover, this disclosure relates to a process for testing SIM cards and/or other wireless components. This disclosure further relates generally to a system for switching and testing SIM cards and/or other wireless components. Moreover, this disclosure relates to a process for switching and testing SIM cards and/or other wireless components. Additionally, this disclosure further relates generally to a system for switching between SIM cards and testing SIM cards and/or other wireless components. Moreover, this disclosure relates to a process for switching between SIM cards and testing SIM cards and/or other wireless components.

2. Related Art

A subscriber identity module or subscriber identification module (SIM), widely known as a SIM card, is an integrated circuit that is intended to securely store data used to identify and authenticate subscribers on mobile devices, such as mobile phones, computers, satellite phones, smart watches, computers, cameras, and/or the like. In particular, SIM cards store network-specific information used to authenticate and identify subscribers on the network.

Currently there is no device and process to easily test multiple SIM cards in conjunction with particular mobile devices and/or particular mobile networks. Moreover, there is no device and process to easily switch SIM cards for implementation with particular mobile devices and/or particular mobile networks.

Accordingly, there is a need for a system and process to switch SIM cards for implementation with particular mobile devices and/or particular mobile networks. Moreover, there is a need for a system and process to test the SIM cards in conjunction with particular mobile devices and/or particular mobile networks.

SUMMARY OF THE DISCLOSURE

One aspect includes a wireless device component testing system, the wireless device component testing system includes a SIM switcher device; the SIM switcher device configured to connect to a wireless device, a computer system, and a plurality of SIM cards; and the SIM switcher device is configured support testing of the plurality of SIM cards in conjunction with the wireless device, where the wireless device component testing system is configured to implement testing for the plurality of SIM cards, the wireless device, and a wireless network.

One aspect includes a wireless device component testing process, the wireless device component testing process includes providing a SIM switcher device; configuring the SIM switcher device to connect to a wireless device, a computer system, and a plurality of SIM cards; and configuring the SIM switcher device to support testing of the plurality of SIM cards in conjunction with the wireless device, where the wireless device component testing process is configured to implement testing for the plurality of SIM cards, the wireless device, and a wireless network.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, processes, and systems for carrying out the several purposes of the disclosure. It is important, therefore, that the claims be regarded as including such equivalent constructions insofar as they do not depart from the spirit and scope of the disclosure.

DETAILED DESCRIPTION

In the description that follows, the disclosure may be described in reference to one or more aspects for a system and process for switching subscriber identity module (SIM) cards and/or for testing subscriber identity module (SIM) cards and/or other wireless device components. The disclosure, however, is not limited to any particular application nor is it limited by the examples described below. Various modifications to the disclosed aspects may be apparent to those skilled in the art and the general principles defined herein may be applied to other aspects and applications without departing from the spirit and scope of the disclosures. Therefore, the description of the aspects that follow are for purposes of illustration and not limitation.

Reference in this specification to "one aspect," "an aspect," "other aspects," "one or more aspects" and/or the like means that a particular feature, structure, or characteristic described in connection with the aspect is included in at least one aspect of the disclosure. The appearances of, for example, the phrase "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described, which may be requirements for some aspects but not other aspects.

Figure 1:
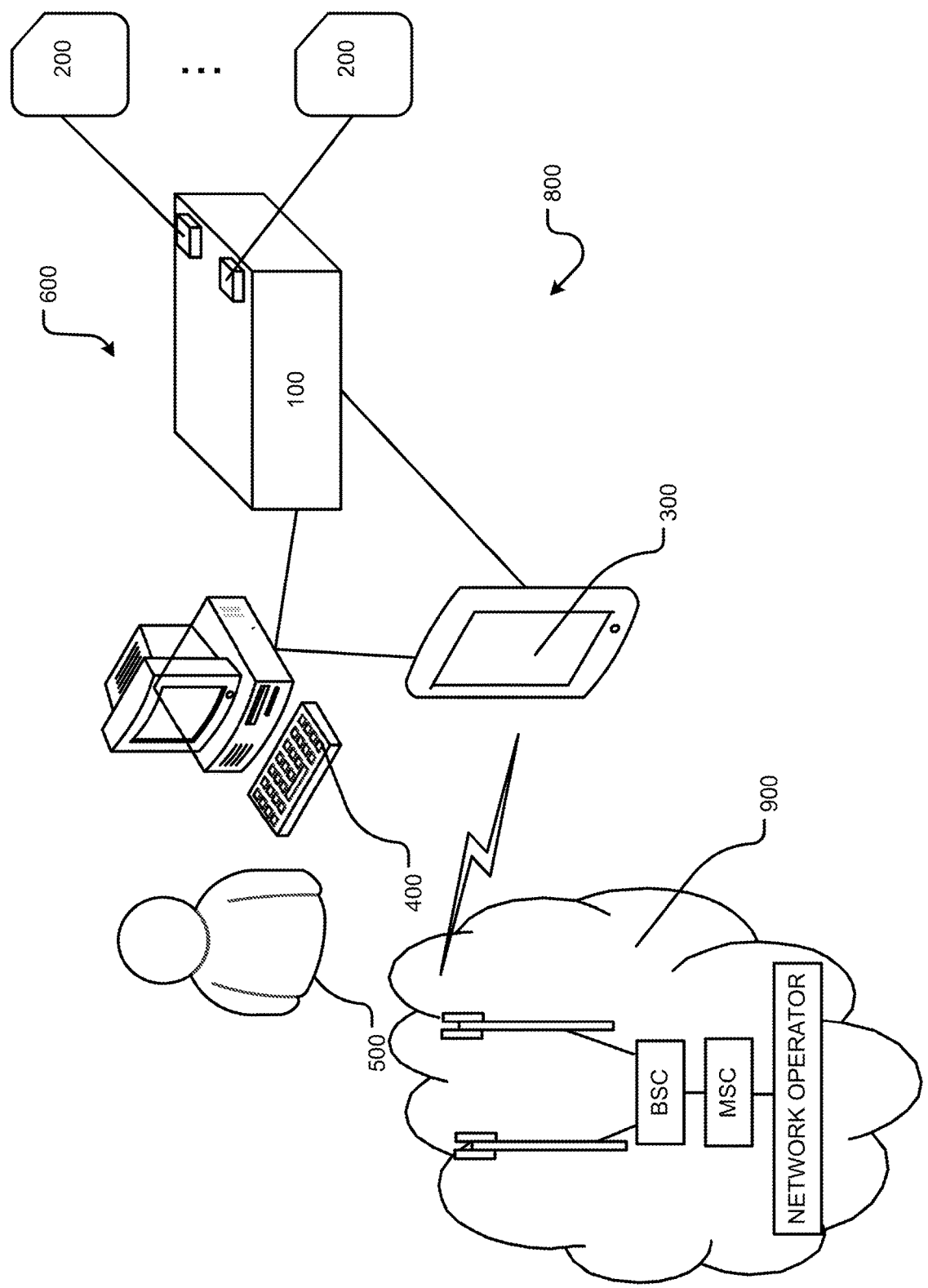
FIG. 1 illustrates a system for switching and/or testing SIM cards and/or other wireless components in accordance with aspects of the disclosure together with other components and/or systems.

FIG. 1 illustrates a system for switching and/or testing SIM cards and/or other wireless components in accordance with aspects of the disclosure together with other components and/or systems.

In particular, FIG. 1 illustrates a wireless device component testing system 600. The wireless device component testing system 600 may include a SIM switcher device 100, a computer system 400, and/or the like. The SIM switcher device 100 may connect to a wireless device 300, the computer system 400, a plurality of SIM cards 200, and/or the like.

The wireless device 300 may be configured to implement radio and signal processing needed to access a wireless network 900 for services. The services may include data services, voice services, text-messaging services, and/or the like. The wireless network 900 may be any network operating consistent with a protocol utilizing a communication channel as defined herein such as a 5G network, an LTE network, a 4G network, a GSM network, and/or the like.

Additionally, the wireless device component testing system 600 may be implemented to be utilized by a user 500. The user 500 may interact with the computer system 400, the SIM switcher device 100, the plurality of SIM cards 200, the wireless device 300, and/or the like. In particular, the user 500 may interact with the SIM switcher device 100 to implement testing of the plurality of SIM cards 200 and/or the wireless device 300.

More specifically, the wireless device component testing system 600 may be configured to implement testing for one or more of the SIM switcher device 100, the plurality of SIM cards 200, the wireless device 300, the computer system 400, the wireless device component testing system 600, the wireless network 900, combinations thereof, and/or the like. In particular, for ease of description, one or more of the SIM switcher device 100, the plurality of SIM cards 200, the wireless device 300, the computer system 400, the wireless device component testing system 600, the wireless network 900, combinations thereof, and/or the like being tested will be referred to as a device under test or a DUT 800. In one aspect, the DUT 800 includes the plurality of SIM cards 200 and the wireless device 300. In one aspect there may be a plurality of one or more of the wireless device 300, the SIM switcher device 100, the computer system 400, the wireless device component testing system 600, the wireless network 900, and/or the like.

In this regard, the SIM switcher device 100 may be configured to connect to the plurality of SIM cards 200 and selectively switch to or connect to one of the plurality of SIM cards 200 for implementation with the wireless device 300 for testing various functionality of the wireless device 300, the plurality of SIM cards 200, the wireless network 900, and/or the like. More specifically, the SIM switcher device 100 may switch to and implement a particular one of the plurality of SIM cards 200. Thereafter, the SIM switcher device 100 may switch to and implement another one of the plurality of SIM cards 200. Furthermore, the SIM switcher device 100 may switch to and implement a particular one of the plurality of SIM cards 200 in conjunction with the 300. Thereafter, the SIM switcher device 100 may switch to and implement another one of the plurality of SIM cards 200 in conjunction with the 300. Accordingly, testing of the plurality of SIM cards 200 in conjunction with the wireless device 300, the computer system 400, the wireless network 900, and/or the like (the DUT 800) can be quickly and easily accomplished as described herein.

In this regard, the SIM switcher device 100 may connect the wireless device 300 to a particular one of the plurality of SIM cards 200 and the wireless device 300 may connect to the wireless network 900. Thereafter, the computer system 400, the wireless device 300, the wireless network 900, the SIM switcher device 100, and/or the like may operate, measure, test, analyze, and/or the like the performance of the DUT 800. Thereafter, the process may be repeated for other ones of the plurality of SIM cards 200 in conjunction with the DUT 800. In particular, the wireless device component testing system 600 may operate and/or process in an automated implementation that operates, once set up, without further input by the user 500 to implement testing for one or more of the SIM switcher device 100, the plurality of SIM cards 200, the wireless device 300, the computer system 400, the wireless device component testing system 600, the wireless network 900, combinations thereof, and/or the like.

Figure 2:
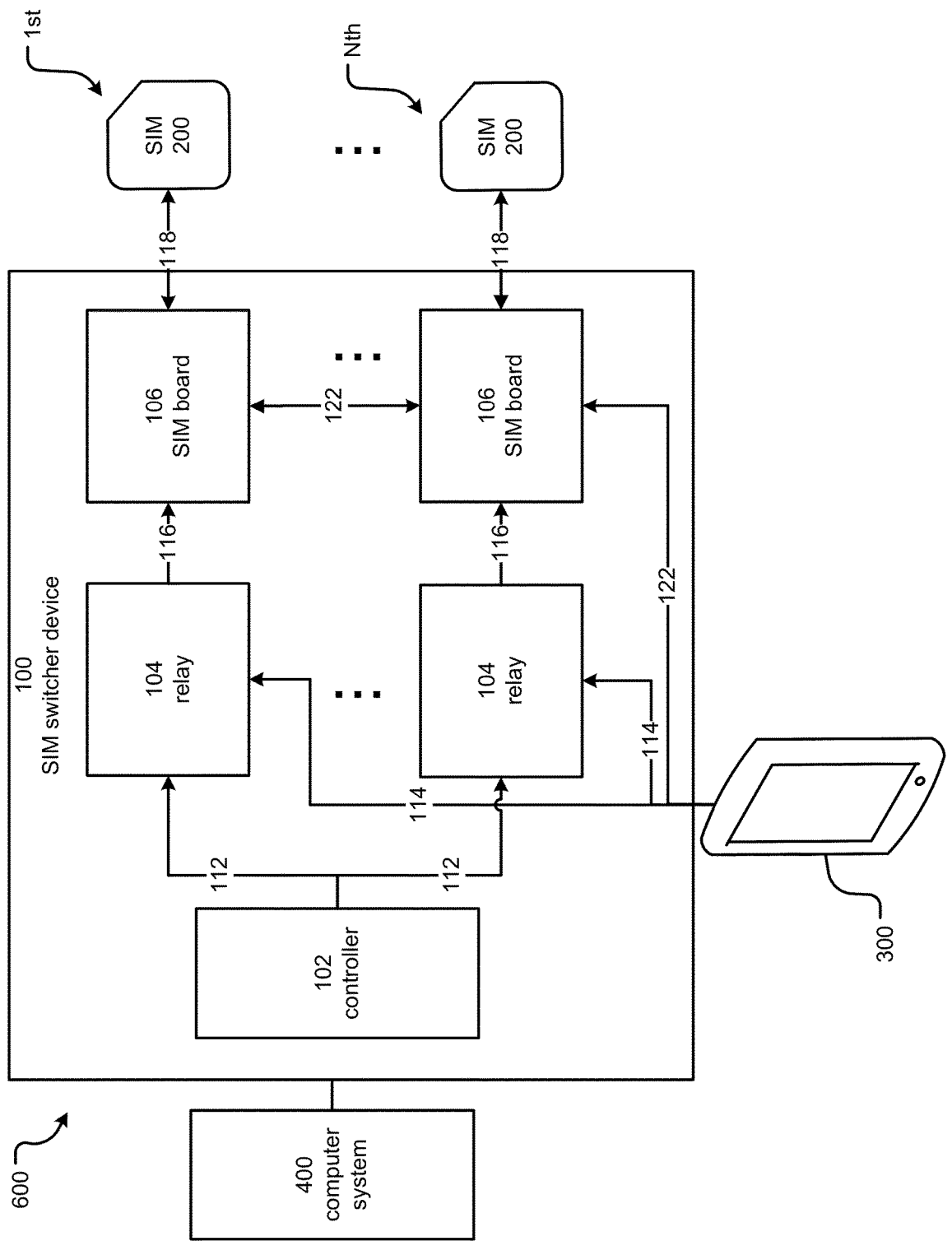
FIG. 2 illustrates details of a SIM switcher device in accordance with aspects of the disclosure.

FIG. 2 illustrates details of a SIM switcher device in accordance with aspects of the disclosure.

With reference to FIG. 2, the SIM switcher device 100 may include a controller 102, a plurality of relays 104, a plurality of SIM boards 106, and/or the like. The controller 102 may be implemented as a microcontroller or other dedicated hardware as defined herein. The controller 102 may be responsive to the computer system 400, the wireless device 300, the user 500, and/or the wireless network 900. The controller 102 may be configured to control the SIM switcher device 100. The controller 102 may connect to each of the plurality of relays 104 on a data/power line 112. The data/power line 112 may be a single line, multiple lines, data only, power only, data and power, and/or the like.

The controller 102 may provide an enable signal to each of the plurality of relays 104 on the data/power line 112. In particular, the controller 102 may provide an enable signal to a single one of the plurality of relays 104 on the data/power line 112 to actuate that single one of the plurality of relays 104. More specifically, the controller 102 operating to enable a particular one of the plurality of relays 104 that results in a selection of a particular one of the plurality of SIM cards 200. In other words, the controller 102 switches to a particular one of the plurality of SIM cards 200. In this regard, the controller 102 switching to a particular one of the plurality of SIM cards 200 is a switching to a particular one of the plurality of SIM cards 200 to operate as and/or with the DUT 800.

The wireless device 300 may connect to each of the plurality of relays 104 on a data/power line 114. The data/power line 114 may be a single line, multiple lines, data only, power only, data and power, and/or the like. The wireless device 300 may provide power via the data/power line 114, such as a Vcc (voltage common collector), to the plurality of relays 104.

The plurality of relays 104 may connect to the plurality of SIM boards 106 via a data/power line 116. The data/power line 116 may be a single line, multiple lines, data only, power only, data and power, and/or the like. The plurality of relays 104 may also provide power via the data/power line 116, such as a Vcc (voltage common collector), to the plurality of SIM boards 106. The plurality of relays 104 may also provide via the data/power line 116 programming power, such as a Vpp to the plurality of SIM boards 106.

The plurality of SIM boards 106 may also connect to the wireless device 300 on a data/power line 122. The data/power line 122 may be a single line, multiple lines, data only, power only, data and power, and/or the like. The data/power line 122 may provide between the wireless device 300 and the plurality of SIM boards 106 one or more sources of power, data, control, instructions, and/or the like. For example, the data/power line 122 may deliver one or more sources of power, data, control, instructions, and/or the like that may include a Vcc, a Reset (Card Reset), a CLOCK (Card Clock), an Application Specific signal/feature, a GND (Ground), a VPP (+21 v DC [Programming], or NC), a I/O (In/Out [Data]), an Application Specific signal/feature, and/or the like.

Additionally, the data/power line 122 may include an end connector for connecting to the wireless device 300. The end connector of the data/power line 122 may be configured with a pattern of contacts matching a pattern of contacts of a SIM card. The end connector of the data/power line 122 may be inserted into the wireless device 300 such that the pattern of contacts contact corresponding SIM card contacts of the wireless device 300. The data/power line 122 may include a ribbon construction.

The plurality of SIM boards 106 may each also connect to one of the plurality of SIM cards 200 on a data/power line 118. The data/power line 118 may be a single line, multiple lines, data only, power only, data and power, and/or the like. The data/power line 118 may provide between the plurality of SIM cards 200 and the plurality of SIM boards 106 one or more sources of power, data, control, instructions, and/or the like. For example, the data/power line 118 may deliver one or more sources of power, data, control, instructions, and/or the like that may include a Vcc, a Reset (Card Reset), a CLOCK (Card Clock), an Application Specific, a GND (Ground), a VPP (+21 v DC [Programming], or NC), a I/O (In/Out [Data]), an Application Specific, and/or the like.

Additionally, each of the plurality of SIM boards 106 and/or the data/power line 118 may be configured with a pattern of contacts matching a pattern of contacts of a SIM card. Each of the plurality of SIM cards 200 may be inserted into one of the plurality of SIM boards 106 of the SIM switcher device 100 such that the pattern of contacts of the plurality of SIM boards 106 contact SIM card contacts of the plurality of SIM cards 200. Accordingly, the plurality of SIM boards 106 may make a connection to the plurality of SIM cards 200 and the plurality of SIM boards 106 may connect to the wireless device 300 such that the combination of the plurality of SIM boards 106, the data/power line 118, the plurality of SIM cards 200, the data/power line 122, and/or the like emulate operation of a selected one/switched one of the plurality of SIM cards 200 in the wireless device 300.

Additionally, the SIM switcher device 100 may include a plurality of the plurality of relays 104, the plurality of SIM boards 106, and the plurality of SIM cards 200. In this regard, as illustrated in FIG. 2, there may be a first one of the plurality of the plurality of relays 104, the plurality of SIM boards 106, and the plurality of SIM cards 200; there may be a second one (not shown) of the plurality of the plurality of relays 104, the plurality of SIM boards 106, and the plurality of SIM cards 200; there may be a third one (not shown) of the plurality of the plurality of relays 104, the plurality of SIM boards 106, and the plurality of SIM cards 200; and there may be an Nth one of the plurality of relays 104, the plurality of SIM boards 106, and the plurality of SIM cards 200. In this regard, N may be any whole number two or greater. In one aspect, N may be 2, 3, 4, 5, 6, 7, 8, 9, and so on. Accordingly, the SIM switcher device 100 may be able to switch selectively to any one of the N number of the plurality of SIM cards 200 as part of a testing process of the DUT 800.

The controller 102 may operate to enable any particular one of the plurality of relays 104, the plurality of SIM boards 106, the plurality of SIM cards 200, and/or the like. When the controller 102 enables a particular one of the plurality of relays 104, the plurality of SIM boards 106, the plurality of SIM cards 200, and/or the like, the controller 102 provides power to one or more of the plurality of relays 104, the plurality of SIM boards 106, the plurality of SIM cards 200, and/or the like. Additionally, the controller 102 may prevent power to the remaining ones of the plurality of relays 104, the plurality of SIM boards 106, the plurality of SIM cards 200, and/or the like. Accordingly, the controller 102 may enable a particular one of the plurality of relays 104, the plurality of SIM boards 106, the plurality of SIM cards 200, and/or the like and the wireless device 300 may connect to the enabled one of the plurality of relays 104, the plurality of SIM boards 106, the plurality of SIM cards 200, and/or the like via the data/power line 114, the data/power line 122, and/or the like. Accordingly, the wireless device 300 may operate in conjunction with the particular enabled one of the plurality of SIM cards 200 as enabled by the controller 102.

The controller 102 may operate in response to the wireless device component testing system 600, the wireless device 300, the computer system 400, the wireless network 900, and/or the user 500. In one aspect, the user 500 may interact with the computer system 400 and the controller 102 of the SIM switcher device 100 and may enable a particular one of the plurality of relays 104, the plurality of SIM boards 106, the plurality of SIM cards 200, and/or the like for the wireless device 300. After which, the computer system 400, the wireless device 300, the wireless network 900, the SIM switcher device 100, and/or the like may operate to, measure, test, analyze, and/or the like the performance of the wireless device 300, the wireless network 900, the plurality of SIM cards 200, the DUT 800, and/or the like.

Thereafter, the user 500 may interact with the computer system 400 and the controller 102 of the SIM switcher device 100 may enable another particular one of the plurality of relays 104, the plurality of SIM boards 106, the plurality of SIM cards 200, and/or the like for the wireless device 300. After which, the computer system 400, the wireless device 300, the wireless network 900, the SIM switcher device 100, and/or the like may operate, measure, test, analyze, and/or the like the performance of the wireless device 300, the wireless network 900, the plurality of SIM cards 200, the DUT 800, and/or the like.

Additionally, the controller 102, the plurality of relays 104, the plurality of SIM boards 106, the plurality of SIM cards 200, the DUT 800, and/or other like components may include and/or may be arranged on a substrate, a printed circuit board (PCB) component, a ceramic component, a glass component, a low temperature co-fired ceramic (LTCC) component, a high temperature co-fired ceramic (HTCC) component, a thick film substrate component, and/or the like. Moreover, the controller 102, the plurality of relays 104, the plurality of SIM boards 106, the plurality of SIM cards 200, the DUT 800, and/or other like components may include or may be connected by one or more wires, leads, vias, edge platings, circuit traces, tracks, clips, and/or the like. Moreover, the SIM switcher device 100 may include various mechanical fasteners, standoffs, and/or the like.

Additionally, the controller 102, the plurality of relays 104, the plurality of SIM boards 106, and/or other like components may be connected utilizing an adhesive, soldering, sintering, eutectic bonding, thermal compression bonding, ultrasonic bonding/welding, a clip component, and/or the like as described herein.

Additionally, the SIM switcher device 100 may include a housing. The housing may be a fully enclosed structure. In one aspect, one or more portions of the housing may be formed of synthetic material, such as plastic. In one aspect, one or more portions of the housing may be formed of synthetic material, such as molded plastic. In one aspect, the housing may include apertures to allow for connections thereto.

In one aspect, the housing encloses one or more of the components illustrated in FIG. 2 and provides a synergistic arrangement of components increasing portability and usability. In one aspect, the housing may be hermetically sealed to prevent intrusion of foreign objects. In one aspect, the housing may be waterproof to prevent intrusion of water. In one aspect, the housing may be watertight to prevent intrusion of water. In this regard, the housing may include one or more seals, gaskets, adhesive, waterproof coating, potting materials, and/or the like.

In one aspect, the controller 102 of the SIM switcher device 100 may be implemented as a microcontroller chip and may be configured to provide the operational brains and may be connected to the plurality of relays 104 and a different one of the plurality of SIM boards 106 that are implemented as boards. The user 500 can enter into the wireless device component testing system 600, for example, a serial input of "board_a" (an implementation of one of the plurality of SIM boards 106) and SIM board A will be powered on and which is connected to the wireless device 300. Once the serial input is received by the controller 102, it will power on a particular one of the plurality of relays 104. In one aspect, once the serial input is received by the controller 102, it will power on a particular one of the plurality of relays 104, which will send a high signal to a pin causing the pin, which is connected to one of the plurality of SIM boards 106 to also be powered. Other implementations for connecting and/or powering the plurality of SIM boards 106 is contemplated as well.

In one aspect, the controller 102 of the SIM switcher device 100 may be configured to implement one or more options and the controller 102 may be implemented by an Arduino Microcontroller (that may implement an ATmega2560 chip). The option may be selected by the user 500 to be implemented by the controller 102 through interaction with a human machine interface associated with the 400, the 500, the 100, and/or the like. Thereafter, the selected option will be sent to the 102 such as the Arduino Microcontroller implementation of the 102. Depending on the option picked, a corresponding one of the plurality of relays 104 will be triggered and operate the corresponding one of the plurality of SIM boards 106 based on the option chosen. For example, depending on the option picked, a corresponding one of the plurality of relays 104 will be triggered and send a signal to an input pin. Once that input pin is HIGH, it will trigger an output pin and send a signal to the corresponding one of the plurality of SIM boards 106 based on the option chosen.

One option may include—Powering on the SIM Board. In this regard, the Input may be: ./SimSwitcher board_a; and an Output may be: Powering on Sim Board A . . . done! Another option may include—Obtaining status. In this regard, the Input may be: ./SimSwitcher status; and the Output may be: SIM Board A is currently powered on.

Another option may include—Incorrect command. In this regard, the Input may be: ./SimSwitcher [any wrong command value]; and the Output may be: Incorrect Command, please try again. Another option may include—Incorrect board. In this regard, the Input may be: ./SimSwitcher board_z; and the Output may be: Sim Board Z does not exist! Another option may include—Incorrect parameter. In this regard, the Input may be: ./SimSwitcher [any wrong parameter value]; and the Output may be: Incorrect Parameter, please try again.

In one or more aspects, the wireless device component testing system 600 may be implemented with shared reset flag, RST, clock, CLK, input output, IO, and/or like signal wires. Accordingly, only one SIM Relay node (one of the plurality of relays 104) may power-on at a time. In this regard, Switching may be a serialized process by nature. All other SIM Relay nodes (the plurality of relays 104) may be each turned off before moving on to the next.

Additionally, upon power loss or bumped cable, the 102, such as Arduino Microcontroller (that may implement an ATmega2560 chip) implementation of the 102, may power off and reinitialize upon power restoration. Utilizing a memory, such as the internal ATMega2560 EEPROM (electrically erasable programmable read-only memory) to record and prevent data loss, the wireless device component testing system 600 can ensure values are constant even during a power loss in memory. The memory, such as the ATMega2560 EEPROM, has a life expectancy of 100,000 cycles. Accordingly, the wireless device component testing system 600 is configured such that unnecessary writes are minimized. In other words, the wireless device component testing system 600 is configured such that it implements a write only if necessary. Additionally, the wireless device component testing system 600 may be configured such that checks are performed to ensure the written state is not already present.

All serial inputs may be a string such as "board_a" and truncated with a command character to prevent random serial characters triggering actions. Some devices may require a restart after switching SIMs. To ensure consistency, each time the SIM switcher device 100 performs a switching operation, the wireless device 300 may be power cycled, modem reset, and/or the like. To ensure controllability after each reset, a lock screen may not be present on the wireless device 300, otherwise the wireless device 300 may become uncontrollable.

Figure 3:
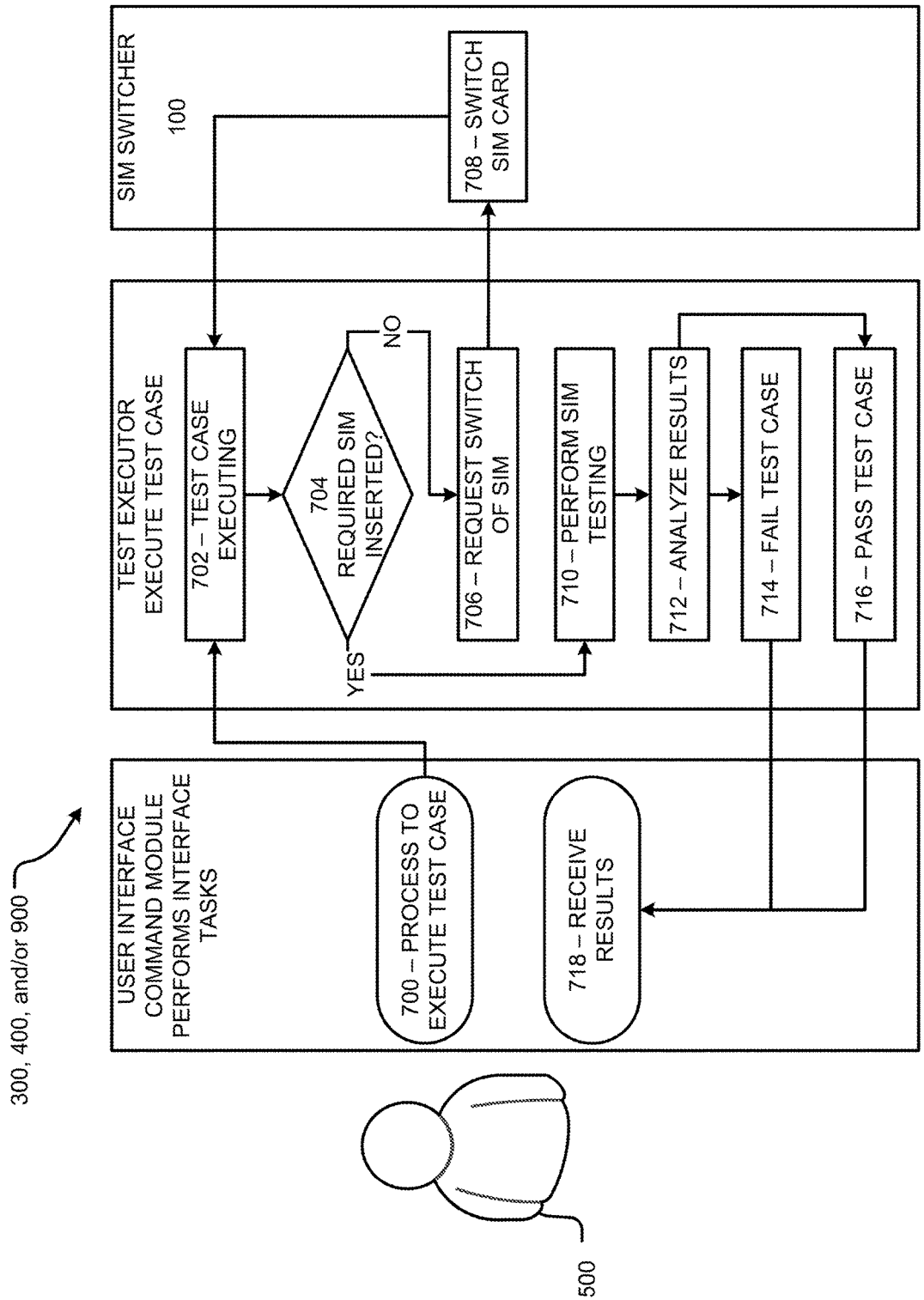
FIG. 3 illustrates a SIM switching and/or testing process in accordance with aspects of the disclosure.

FIG. 3 illustrates a SIM switching and/or testing process in accordance with aspects of the disclosure.

In particular, FIG. 3 illustrates a testing process 700 or process to execute a test case for testing one or more of the SIM switcher device 100, the plurality of SIM cards 200, the wireless device 300, the computer system 400, the wireless device component testing system 600, the wireless network 900, combinations thereof, and/or the like referred to as a device under test or the DUT 800. It should be noted that the testing process 700 is merely exemplary and may be modified consistent with the various aspects disclosed herein. In particular, the testing process 700 may be performed in a different order consistent with the aspects described herein.

Moreover, the testing process 700 may be modified to have more or fewer processes consistent with the various aspects disclosed herein.

With further reference to FIG. 3, one or more of the aspects of the testing process 700 may be implemented in various components of the wireless device component testing system 600. In one aspect, the computer system 400 may be implemented and configured as a user interface, a command module, and/or the like. Moreover, the computer system 400 may be configured to perform interface tasks. Additionally, the computer system 400 may be implemented configured as a test executor to execute a test case. However, any one of the SIM switcher device 100, the wireless device 300, the computer system 400, the wireless device component testing system 600, the wireless network 900, the DUT 800, and combinations thereof, may be utilized to perform any part of the testing process 700 as described herein.

The testing process 700 of FIG. 3 may include a test case executing as illustrated in box 702. In particular, the process associated with box 702 of the testing process 700 may be implemented with the wireless device component testing system 600 and/or the computer system 400. However, the process associated with box 702 may be implemented utilizing other configurations as described herein.

In particular, the test case executing (box 702) may be started in response to a request from the user 500, a command from the computer system 400, the wireless device 300, the SIM switcher device 100, the wireless device component testing system 600, the wireless network 900, combinations thereof, and/or the like. Additionally, the test case executing (box 702) may include various system checks prior to advancing the process to box 704.

The testing process 700 of FIG. 3 may include determining whether a required SIM is in the SIM switcher device 100 as illustrated in box 704. In particular, the process associated with box 704 of the testing process 700 may be implemented with the wireless device component testing system 600 and/or the computer system 400. However, the process associated with box 704 may be implemented utilizing other configurations as described herein.

In particular, determining whether a required SIM is in the SIM switcher device 100 (box 704) may include sensing whether there is a particular one of the plurality of SIM cards 200 loaded in the SIM switcher device 100. In particular, whether a particular one of the plurality of SIM cards 200 is loaded in the plurality of SIM boards 106.

In one aspect, the testing process 700 may look up, analyze, compare, and/or the like the following information for a particular one of the plurality of SIM cards 200 loaded in the SIM switcher device 100: an Integrated Circuit Card Identifier (ICCID), an Authentication Key (Ki), a Local Area Identity (LAI), an Operator-Specific Emergency Number, a SMSC (Short Message Service Center) number, a Service Provider Name (SPN), a Service Dialing Numbers (SDN), an Advice-Of-Charge parameters, Value Added Service (VAS) applications, and/or the like. If the correct one of the plurality of SIM cards 200 is loaded in the SIM switcher device 100, the testing process 700 may advance to the process associated with box 710. On the other hand, if the incorrect one of the plurality of SIM cards 200 is loaded in the SIM switcher device 100, the testing process 700 may advance to the process associated with box 706.

The testing process 700 of FIG. 3 may include a request to switch a SIM as illustrated in box 706. In particular, the process associated with box 706 of the testing process 700 may be implemented with the wireless device component testing system 600 and/or the computer system 400. However, the process associated with box 706 may be implemented utilizing other configurations as described herein.

In this regard, a request to switch a SIM (box 706) may include receiving a request for switching to a particular one of the plurality of SIM cards 200. More specifically, the SIM switcher device 100, the wireless device 300, the computer system 400, the user 500, the wireless device component testing system 600, the testing process 700, combinations thereof, and/or the like may send a request to switch a SIM (box 706) to the SIM switcher device 100. Thereafter, the process advances to box 708.

The testing process 700 of FIG. 3 may include a switch SIM card process as illustrated in box 708. In particular, the process associated with box 708 of the testing process 700 may be implemented with the SIM switcher device 100. However, the process associated with box 708 may be implemented utilizing other configurations as described herein.

In this regard, a switch SIM card process (box 708) may include operating the controller 102, the plurality of relays 104, the plurality of SIM boards 106, and/or the like to switch from one of the plurality of SIM cards 200 to another one of the plurality of SIM cards 200. More specifically, the controller 102 may operate so as to enable a desired one of the plurality of relays 104, the plurality of SIM boards 106, and the plurality of SIM cards 200 for subsequent use as part of the testing process 700. Thereafter, the process associated with box 708 returns to box 702, box 704, and if the correct SIM is now inserted, the process will advance to box 710.

The testing process 700 of FIG. 3 may include performing SIM testing as illustrated in box 710. In particular, the process associated with box 710 of the testing process 700 may be implemented with the wireless device component testing system 600 and/or the computer system 400. However, the process associated with box 710 may be implemented utilizing other configurations as described herein.

In particular, the testing process 700 may be implemented by applying various control signals, voltages, and/or currents to the DUT 800. In this regard, the wireless device component testing system 600 may include at least one power source having at least one controllable voltage and/or current output that may operate the DUT 800 by applying various signals, voltages, and/or currents to the SIM switcher device 100, the plurality of SIM cards 200, the wireless device 300, the computer system 400, the wireless device component testing system 600, the DUT 800, combinations thereof, and/or the like. Moreover, the wireless device component testing system 600 may include at least one sensor, such as a current sensor, a voltage sensor, a temperature sensor, and/or the like to measure and determine various characteristics of the DUT 800.

The wireless device component testing system 600 may be used to physically acquire signals from nodes of the DUT 800. The wireless device component testing system 600 may be implemented, may be controlled, may control, and/or the like in conjunction with the wireless device 300, the computer system 400, the user 500, other dedicated hardware as defined herein, combinations thereof, and/or the like.

The wireless device component testing system 600 may utilize connectors, manipulators, and/or the like, which may allow a connection to the DUT 800. In one aspect, the connectors and/or manipulators may include the connectors implemented as contacts, needles, pads, and/or the like that may be positioned in relation to the DUT 800 for capturing data, voltages, currents, and/or the like. Moreover, the connectors and/or manipulators may be positioned in relation to the DUT 800 for applying voltages, currents, and/or the like.

The wireless device component testing system 600 and/or the computer system 400 may include a processor, a temperature-controlled environment system, a power supply, a memory, a display, a read-only memory, an input device, an input/output device, a human machine interface, an analog-to-digital converter, a digital to analog converter, a clock, one or more sensors, a power source, and/or the like.

The processor may be configured to process at least in part test processes, test functions, provide other test services, implement the testing process 700, and/or the like. The temperature-controlled environment system may be a device or system to provide desired temperature-controlled environment for testing of the DUT 800. The temperature-controlled environment system may include a heating device, a heating device controller, a cooling device, a cooling device controller, a temperature sensor, and/or the like.

The power source may be configured as a highly stable DC power source, a constant current source, a constant voltage source, a variable current source, a variable voltage source, and/or the like. The power source may be configured for applying voltages, currents, and/or the like to the DUT 800.

The one or more sensors may measure various device characteristics. In particular, one or more sensors may be implemented as one or more temperature sensors to measure a temperature of the DUT 800, measure a temperature of the temperature-controlled environment system, and/or the like. The one or more temperature sensors may be implemented as a Negative Temperature Coefficient (NTC) thermistor, a Resistance Temperature Detector (RTD), a thermocouple, a semiconductor-based sensor, and/or the like. The one or more sensors may include one or more current sensors, one or more voltage sensors, and/or the like. The one or more current sensors may be configured for measuring currents at the DUT 800. The one or more voltage sensors may be configured for measuring voltage at the DUT 800.

The wireless device component testing system 600 may implement instrument integration, communication, test protocols, test time, and/or the like by utilizing an on-board script processor. The wireless device component testing system 600 may allow user-defined on-board script execution for controlling test sequencing, test flow, decision making, instrument autonomy, implementation of the testing process 700. The wireless device component testing system 600 may include contact check functionality to verify good connections to the DUT 800 before the test begins.

The wireless device component testing system 600 may implement automation to quickly perform measurements and evaluate the test results. The wireless device component testing system 600 may implement a computer-controlled digital multimeter, a complicated system containing dozens of complex test instruments, which may be real electronic test equipment or simulated electronic test equipment, capable of automatically testing and diagnosing faults in the 100, the 400, the 300, and/or the like. The wireless device component testing system 600 may implement a master controller that synchronizes one or more source and capture instruments.

The wireless device component testing system 600 may include multiple computer-controlled instruments to source or measure a wide range of parameters related to the 100, the 300, the 400, the 900, and/or the like. The instruments may include device power supplies (DPS), parametric measurement units (PMU), arbitrary waveform generators (AWG), digitizers, digital 10s, utility supplies, and/or the like. The instruments perform different measurements on the DUT 800, and the instruments are synchronized so that they source and measure waveforms at the proper times. The wireless device component testing system 600 may test whether or not the 800 is working correctly; and when the DUT 800 is not working correctly, to diagnose the reason.

Additionally, the wireless device component testing system 600 may implement an operating system, a touchscreen controller, a communications component, a graphics component, a contact/motion component, and/or the like to provide full functionality. In particular, the processor may be configured to execute a software application configured to control the wireless device component testing system 600 such as the testing process 700 as described herein. In one aspect, the software application may be configured to interact with the one or more sensors and/or the like as described herein. In particular, the one or more sensors may provide signals to the processor.

The wireless device component testing system 600 may implement a testing protocol that may include the testing process 700. The testing protocol may determine particular voltage levels, current amounts, time periods, and/or the like for the delivery to the DUT 800. The wireless device component testing system 600 may be configured to utilize outputs from the one or more sensors to adjust the current, voltage, and/or the like provided by a power source to the DUT 800 in conjunction with the testing process 700.

Additionally, the testing process 700 in conjunction with the wireless device component testing system 600 may provide a temperature-controlled environment. In this regard, the testing process 700 of FIG. 3 may include arranging any one or more of the SIM switcher device 100, the plurality of SIM cards 200, the wireless device 300, the computer system 400, the DUT 800, and/or the like in a temperature-controlled environment.

Additionally, the testing process 700 in conjunction with the wireless device component testing system 600 may capture cellular connectivity information that may include one or more of the following: whether the wireless device 300 is registered to the Radio Access Network; a current cell tower identification (ID) that the wireless device 300 connects; a Location Area Code (LAC) for the wireless device 300; a signal strength (dB) for the wireless device 300 and/or the wireless network 900; a Signal-to-Noise Ratio (SNR) for the wireless device 300 and/or the wireless network 900; an LTE RSSI (Received Signal Strength Indicator) for the wireless device 300 and/or the wireless network 900; an LTE RSRQ (Reference Signal Received Quality) for the wireless device 300 and/or the wireless network 900; an LTE SINR (Signal to Interference & Noise Ratio) for the wireless device 300 and/or the wireless network 900; an LTE CQI (Channel Quality Indicator) for the wireless device 300 and/or the wireless network 900; a RSRP (Reference Signal Received Power) for the wireless device 300 and/or the wireless network 900; and/or the like.

In some aspects, the RSRP and the RSRQ may be measures of a signal level and quality for the wireless device 300 and/or the wireless network 900. In the wireless network 900, when the wireless device 300 moves from cell to cell and performs cell selection/reselection and handover, the wireless device 300 may measure the signal strength/quality. In aspects, the wireless network 900 and/or the wireless device 300 may measure parameters with respect to a reference signal that may include the RSRP (Reference Signal Received Power), the RSRQ (Reference Signal Received Quality), and/or the like.

The carrier RSSI (Receive Strength Signal Indicator) may measure the average total received power observed in OFDM (Orthogonal frequency-division multiplexing) symbols containing reference symbols. The parameters may also include the Reference Signal Received Power (RSRP). The RSRP may be considered a RSSI type of measurement. The RSRP may be interpreted as the power of the LTE Reference Signals spread over a full bandwidth, a narrowband, and/or the like.

The Reference Signal Received Quality (RSRQ) may use the number of used Resource Blocks (N) and may be defined as RSRQ=(N*RSRP)/RSSI measured over the same bandwidth. The RSRQ may indicate the quality of the received reference signal.

In some aspects, the RSRP (Reference Signal Receive Power) may be defined as the average power of Resource Elements (RE) that carry cell specific Reference Signals (RS) over the entire bandwidth.

In some aspects, some of the cellular connectivity information may be measured by the transceiver of the wireless device 300, the processor of the wireless device 300, and/or the like. This information obtained by the wireless device 300 may be transmitted to the wireless device component testing system 600. Other parts of the cellular connectivity information may be measured by the transceivers of the wireless network 900, the radio access network (RAN) of the wireless network 900, or other components of the wireless network 900 as described herein. In some aspects, the information obtained by the wireless network 900 may be forwarded to the computer system 400, the wireless device component testing system 600, and/or the like.

The testing process 700 of FIG. 3 may include analyzing results as illustrated in box 712. In particular, the process associated with box 712 of the testing process 700 may be implemented with the wireless device component testing system 600 and/or the computer system 400. However, the process associated with box 712 may be implemented utilizing other configurations as described herein.

The wireless device component testing system 600, the computer system 400, dedicated hardware, and/or the like may determine DUT test information of each of the DUT 800 and may output various DUT test information of each of the DUT 800 to an output device such as a human machine interface, a display, a printer, a database, an analysis system, and/or the like. In one aspect, the wireless device component testing system 600, dedicated hardware, and/or the computer system 400 may determine DUT test information of each of the DUT 800 and may store various DUT test information of each of the DUT 800 to a memory, a database, and/or the like. Additionally, the various DUT test information of each of the DUT 800 may be utilized by the wireless device component testing system 600, the dedicated hardware, and/or the computer system 400 to determine a device failure of each of the DUT 800. The device failure of each of the DUT 800 may be output to an output device such as a human machine interface, a display, a printer, a database, an analysis system, and/or the like of the computer system 400. Finally, the various DUT test information of each of the DUT 800 may be utilized by the wireless device component testing system 600, dedicated hardware as defined herein, and/or the computer system 400 and may be output to an output device such as a human machine interface, a display, a printer, a database, an analysis system, and/or the like.

The testing process 700 may alternatively and/or further utilize artificial intelligence and/or machine learning. The artificial intelligence and/or machine learning may utilize any number of approaches including one or more of cybernetics and brain simulation, symbolic, cognitive simulation, logic-based, anti-logic, knowledge-based, sub-symbolic, embodied intelligence, computational intelligence and soft computing, machine learning and statistics, and/or the like.

The testing process 700 of FIG. 3 may include determining failed test cases as illustrated in box 714. In particular, the process associated with box 714 of the testing process 700 may be implemented with the wireless device component testing system 600 and/or the computer system 400. However, the process associated with box 714 may be implemented utilizing other configurations as described herein.

In particular, the analysis of the DUT 800, the performance of the DUT 800, the cellular connectivity information of the DUT 800, and/or the like may be compared to various ranges, limits, thresholds, values, and/or the like. Based on this comparison, the testing process 700 may determine that the DUT 800 is a failed test case or implementation.

The testing process 700 of FIG. 3 may include determining passed test cases as illustrated in box 716. In particular, the process associated with box 716 of the testing process 700 may be implemented with the wireless device component testing system 600 and/or the computer system 400. However, the process associated with box 716 may be implemented utilizing other configurations as described herein.

In particular, the analysis of the DUT 800, the performance of the DUT 800, the cellular connectivity information of the DUT 800, and/or the like may be compared to various ranges, limits, thresholds, values, and/or the like. Based on this comparison, the testing process 700 may determine that the DUT 800 is a passed test case or implementation.

The testing process 700 of FIG. 3 may include receiving results as illustrated in box 718. In particular, the process associated with box 718 of the testing process 700 may be implemented with the wireless device component testing system 600 and/or the computer system 400. However, the process associated with box 718 may be implemented utilizing other configurations as described herein. In this regard, receiving results as illustrated in box 718 may include outputting to an output device such as a human machine interface, a display, a printer, a database, an analysis system, and/or the like that may be associated with the computer system 400.

Figure 4:
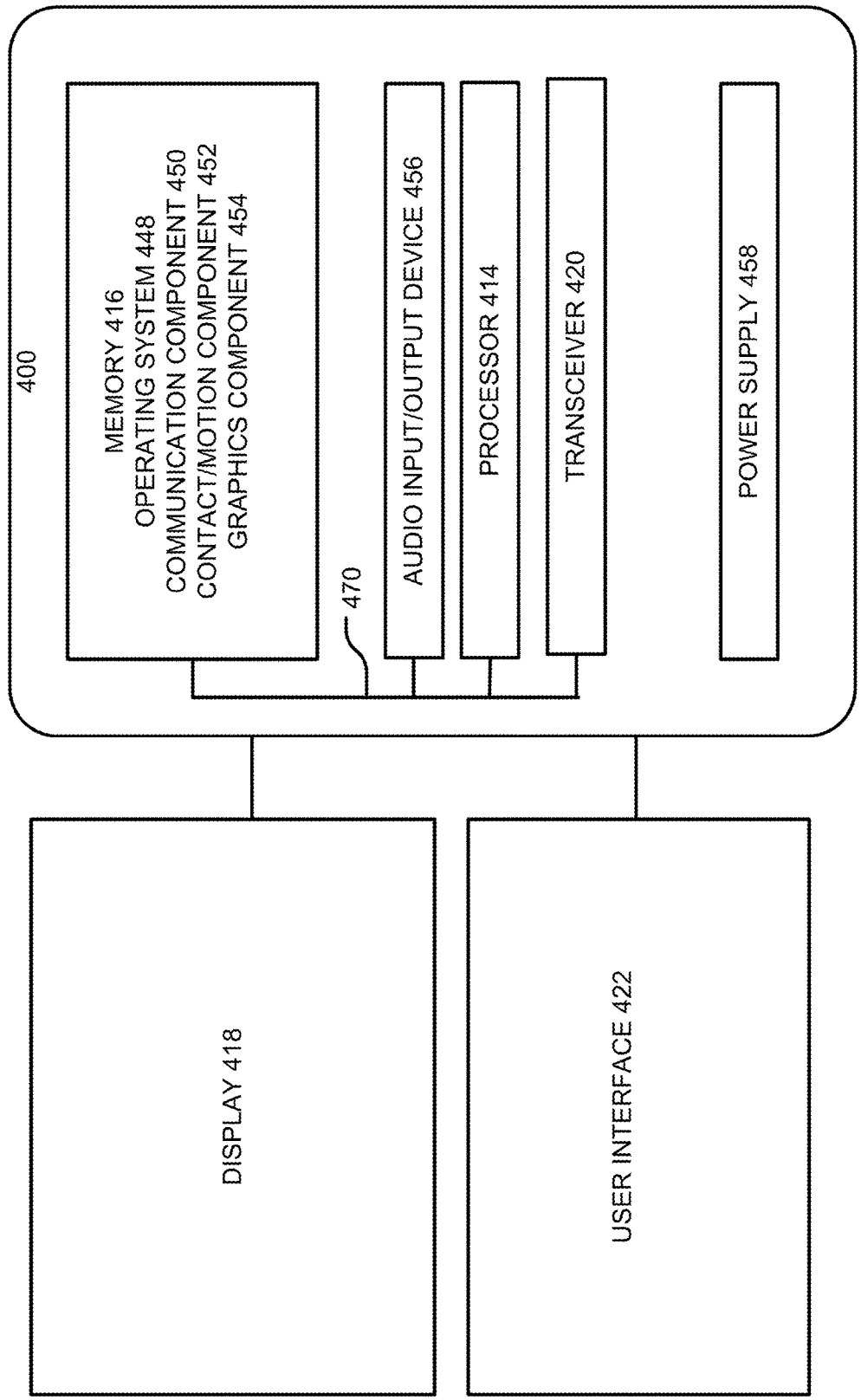
FIG. 4 illustrates a testing computer in accordance with aspects of the disclosure.

FIG. 4 illustrates a testing computer in accordance with aspects of the disclosure.

In particular, FIG. 4 illustrates details of an exemplary implementation of the computer system 400. The computer system 400 may include a processor 414, a power supply 458, a memory 416, a display 418, a user interface 422, an operating system 448, a communication component 450, a contact/motion component 452, a graphics component 454, an audio input/output device 456, the transceiver 420, the bus 470, and/or the like. Additionally, the computer system 400 may include a read-only memory, an input device, an input/output device, an analog-to-digital converter, a digital to analog converter, a clock, one or more sensors, a power source, a printer, a human machine interface, a display, a database, and/or the like. In one aspect, the computer system 400 may be implemented as a server.

Figure 5:
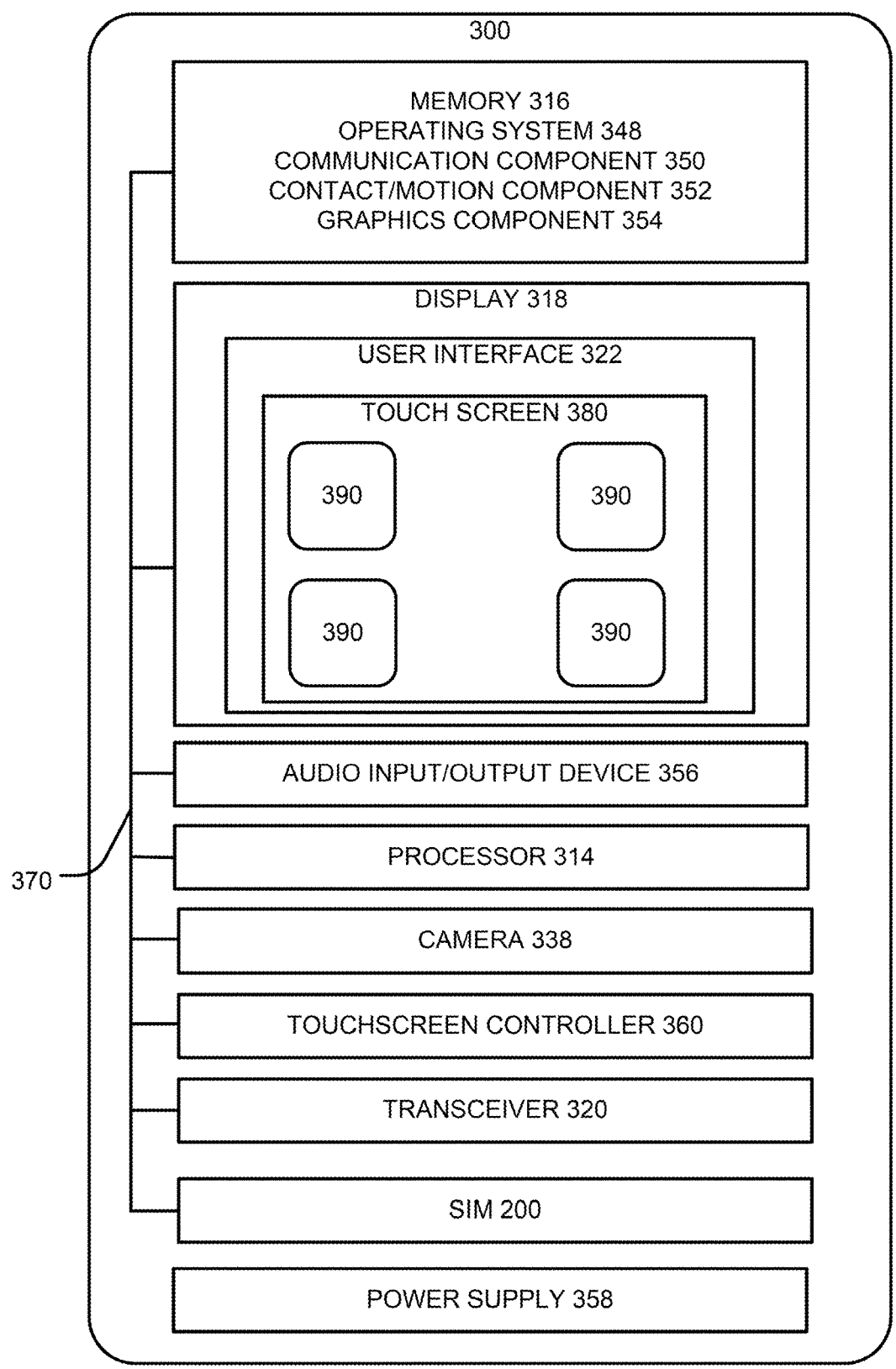
FIG. 5 illustrates a wireless device in accordance with aspects of the disclosure.

FIG. 5 illustrates a wireless device in accordance with aspects of the disclosure.

In this regard, a wireless device 300 is intended to encompass any compatible mobile technology computing device that connects to a wireless communication network and utilizes a UICC, SIM card, and/or the like, such as mobile phones, mobile equipment, mobile stations, user equipment, cellular phones, smartphones and/or the like (e.g., Apple iPhone, iPad, Google Android based devices, BlackBerry based devices, other types of PDAs or smartphones), wireless dongles, wireless access points, devices implemented as an Internet of things (IoT), or other mobile computing devices. The term "wireless device" may be interchangeably used and referred to herein as "wireless handset," "handset," "mobile device," "device," "mobile phones," "mobile equipment," "mobile station," "user equipment," "cellular phone," "smartphones," or "phone." Further, reference in this specification to a "wireless network" or "network" is intended to encompass any type of wireless network to provide wireless services through the use of a wireless device having a UICC, SIM card, and/or the like installed therein, through a Long Term Evolution (LTE) network, 5G network (5th generation mobile networks or 5th generation wireless systems), Global System for Mobile Communications (GSM) network, or any other network operating consistent with a protocol utilizing a communication channel as defined herein.

The wireless device 300 may include a processor 314, a memory 316, a display 318, a transceiver 320, user interface 322, and/or the like. The processor 314 may be configured to process call functions, provide other services to the user, and/or the like.

The wireless device 300 may further include a user interface 322, an audio input/output device 356, a computer readable medium, a camera 338, and a power supply 358. Additionally, the wireless device 300 may implement an operating system 348, a touchscreen controller, a communications component 350, a graphics component 354, a contact/motion component 352, and/or the like to provide full smartphone functionality.

In an exemplary aspect, a touchscreen may be implemented in the display 318 and may detect a presence and location of a touch of a user within the display area. For example, touching the display 318 of the wireless device 300 with a finger or hand. The touchscreen may also sense other passive objects, such as a stylus. The touchscreen may further include a touch screen controller.

In operation, the display 318 may show various objects associated with applications for execution by the processor 314. For example, a user may touch the display 318, particularly the touchscreen, to interact with the objects. That is, touching an object may execute an application in the processor 314 associated with the object that is stored in memory 316. Additionally or alternatively, touching an object may open a menu of options to be selected by the user. The display 318 may include a plurality of objects for the user to interact with. Moreover, the display 318 may include a plurality of screens. The display 318 showing one screen at a time. The user may interact with the display 318 to move a screen into view on the display 318. Various objects may be located in each of the screens.

The touchscreen may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, and/or the like.

The display 318 is generally configured to display a graphical user interface (GUI) that provides an easy to use visual interface between a user of the wireless device 300 and the operating system or application(s) running on the wireless device 300. Generally, the GUI presents programs, files, and operational options with graphical images. During operation, the user may select and activate various graphical images displayed on the display 318 in order to initiate functions and tasks associated therewith.

One or more of the plurality of SIM cards 200 may be implemented as an integrated circuit that may store an International Mobile Subscriber Identity (IMSI) and also may store a key used to identify and authenticate subscribers on the wireless device 300. One or more of the plurality of SIM cards 200 may also store network-specific information used to authenticate and identify subscribers on the wireless network 900. The network-specific information may include an Integrated Circuit Card Identifier (ICCID), Authentication Key (Ki), Local Area Identity (LAI), Operator-Specific Emergency Number, and so on. One or more of the plurality of SIM cards 200 may also store other carrier-specific data such as the SMSC (Short Message Service Center) number, Service Provider Name (SPN), Service Dialing Numbers (SDN), Advice-Of-Charge parameters, Value Added Service (VAS) applications, and/or the like.

One or more of the plurality of SIM cards 200 may include a SIM processor, input/output, SIM Random-Access Memory (RAM), SIM Read-Only Memory (ROM), Electrically Erasable Programmable Read-Only Memory (EEPROM), and/or the like. One or more of the plurality of SIM cards 200 may be implemented as one or more of a full-size SIM (1FF), mini-SIM (2FF), micro-SIM (3FF), and nano-SIM (4FF). One or more of the plurality of SIM cards 200 may further include an operating system configured to store and provide network-specific information used to authenticate and identify subscribers on the network. The operating system may be stored in the SIM RAM, SIM ROM, the EEPROM, and/or the like.

One or more of the plurality of SIM cards 200 may further implement and/or execute in part the testing process 700. In some aspects, the testing process 700 may be implemented by a SIM applet. In some aspects, the testing process 700 may be implemented by software developed with a SIM Application Toolkit (STK). In some aspects, the testing process 700 may be implemented consistent with 3GPP 31.111.

Referring back to FIG. 1, FIG. 1 further shows that the wireless network 900 may include a Mobile services Switching Center (MSC) that may perform the switching of calls and that may include a Visitor Location Register (VLR). The wireless network 900 may also include a Base Transceiver Station (BTS) and a Base Station Controller (BSC). The Base Transceiver Station houses the radio transceivers that define a cell and handle the radio-link protocols with the wireless device 300. The Base Station Controller manages the radio resources for one or more Base Transceiver Station. The Base Station Controller is the connection between the wireless device 300 and the Mobile service Switching Center (MSC).

A Home Location Register (HLR) and the VLR together with the MSC, provide the call-routing and roaming capabilities. The HLR contains all the administrative information of each subscriber registered in the corresponding wireless network 900, along with the current location of the wireless device 300. The wireless device 300 may also be configured to connect to another type of wireless network on a communication channel as defined herein.

The wireless network 900 may include a radio access network (RAN). The radio access network (RAN) may be implemented as part of a mobile telecommunication system of the wireless network 900. The radio access network (RAN) may implement a radio access technology. The radio access network (RAN) may reside between the wireless device 300 and the wireless network 900 and may provide a connection with a core network (CN).

Accordingly, the disclosure has set forth a system and process to test various wireless components in conjunction with a device to switch SIM cards for implementation with particular mobile devices and/or particular mobile networks. The system and process reducing testing time, reducing testing costs, like.

The following are a number of nonlimiting Examples of aspects of the disclosure.

One example includes a wireless device component testing system, the wireless device component testing system includes: a SIM switcher device; the SIM switcher device configured to connect to a wireless device, a computer system, and a plurality of SIM cards; and the SIM switcher device is configured support testing of the plurality of SIM cards in conjunction with the wireless device, where the wireless device component testing system is configured to implement testing for the plurality of SIM cards, the wireless device, and a wireless network.

The above-noted Example may further include any one or a combination of more than one of the following aspects. The wireless device component testing system where the SIM switcher device is configured to connect to the plurality of SIM cards and selectively switch to and connect to one of the plurality of SIM cards for implementation with the wireless device for testing. The SIM switcher device is configured to switch to and implement a particular one of the plurality of SIM cards and thereafter the SIM switcher device is configured to switch to and implement another one of the plurality of SIM cards. A device under test (DUT) includes at least one of the following: the plurality of SIM cards, the wireless device, and the wireless network; and where the wireless device component testing system is configured to operate, measure, test, analyze, and output a performance of the device under test (DUT). The wireless device component testing system is configured to apply various control signals, voltages, and/or currents to the device under test (DUT). The SIM switcher device includes a controller, a plurality of relays, and a plurality of SIM boards. The controller is responsive to at least one of the following: the computer system, the wireless device, a user, and the wireless network. The plurality of SIM boards are each configured to connect to one of the plurality of SIM cards. The controller is configured to control the SIM switcher device. The controller connects to each of the plurality of relays on a data/power line. The controller enables one of the plurality of relays, one of the plurality of SIM boards, and one of the plurality of SIM cards. The wireless device component testing system includes: a data/power line that includes an end connector configured to connect to SIM card contacts of the wireless device; and the data/power line further connects to the plurality of SIM cards. The computer system, the wireless device, the wireless network, the SIM switcher device, operate to, measure, test, and analyze, a performance of the wireless device, the wireless network, and the plurality of SIM cards.

One example includes a wireless device component testing process, the wireless device component testing process includes: providing a SIM switcher device; configuring the SIM switcher device to connect to a wireless device, a computer system, and a plurality of SIM cards; and configuring the SIM switcher device to support testing of the plurality of SIM cards in conjunction with the wireless device, where the wireless device component testing process is configured to implement testing for the plurality of SIM cards, the wireless device, and a wireless network.

The above-noted Example may further include any one or a combination of more than one of the following aspects. The wireless device component testing process includes configuring the SIM switcher device is to connect to the plurality of SIM cards and selectively switch to and connect to one of the plurality of SIM cards for implementation with the wireless device for testing. The wireless device component testing process includes configuring the SIM switcher device is to switch to and implement a particular one of the plurality of SIM cards and thereafter the SIM switcher device is configured to switch to and implement another one of the plurality of SIM cards. A device under test (DUT) includes at least one of the following: the plurality of SIM cards, the wireless device, and the wireless network; and where the wireless device component testing process is configured to operate, measure, test, analyze, and output a performance of the device under test (DUT). The wireless device component testing process is configured to apply various control signals, voltages, and/or currents to the device under test (DUT). The SIM switcher device includes a controller, a plurality of relays, and a plurality of SIM boards. The controller is responsive to at least one of the following: the computer system, the wireless device, a user, and the wireless network. The plurality of SIM boards are each configured to connect to one of the plurality of SIM cards. The controller is configured to control the SIM switcher device. The controller connects to each of the plurality of relays on a data/power line. The controller enables one of the plurality of relays, one of the plurality of SIM boards, and one of the plurality of SIM cards. The wireless device component testing process includes: a data/power line that includes an end connector configured to connect to SIM card contacts of the wireless device; and the data/power line further connects to the plurality of SIM cards.

The solder of the disclosure may be utilized to form a solder interface that may include solder and/or be formed from solder. The solder may be any fusible metal alloy that may be used to form a bond between surfaces to be connected. The solder may be a lead-free solder, a lead solder, a eutectic solder, and/or the like. The lead-free solder may contain tin, copper, silver, bismuth, indium, zinc, antimony, traces of other metals, and/or the like. The lead solder may contain lead, other metals such as tin, silver, and/or the like. The solder may further include flux as needed.

The sintering of the disclosure may utilize a process of compacting and forming a solid mass of material by heat and/or pressure. The sintering process may operate without melting the material to the point of liquefaction. The sintering process may include sintering of metallic powders. The sintering process may include sintering in a vacuum. The sintering process may include sintering with the use of a protective gas.

The eutectic bonding of the disclosure may utilize a bonding process with an intermediate metal layer that may form a eutectic system. The eutectic system may be used between surfaces to be connected. The eutectic bonding may utilize eutectic metals that may be alloys that transform from solid to liquid state, or from liquid to solid state, at a specific composition and temperature without passing a two-phase equilibrium. The eutectic alloys may be deposited by sputtering, dual source evaporation, electroplating, and/or the like.

The ultrasonically welding of the disclosure may utilize a process whereby high-frequency ultrasonic acoustic vibrations are locally applied to components being held together under pressure. The ultrasonically welding may create a solid-state weld between surfaces to be connected. In one aspect, the ultrasonically welding may include applying a sonicated force.

Aspects of the disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system and/or the like.

Further in accordance with various aspects of the disclosure, the processes described herein are intended for operation with dedicated hardware implementations including, but not limited to, PCs, PDAs, SIM cards, semiconductors, application specific integrated circuits (ASIC), programmable logic arrays, cloud computing devices, and other hardware devices constructed to implement the processes described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

The term text message or SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G, 4G, LTE, 5G networks or networks associated with the communication channel as defined herein. In other aspects, text message may include Multimedia Messaging Service (MMS), which is a standard way to send messages that include multimedia content to and from mobile phones. It extends the core SMS (Short Message Service) capability that allowed exchange of text messages only up to 160 characters in length. While the most popular use is to send photographs from camera-equipped handsets, it is also used as a process of delivering news and entertainment content including videos, pictures, text pages and ringtones. MMS can be used within the context of the present disclosure for UICC activation message delivery. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipient's carrier using the Internet.

The term voice or voice calls as utilized herein may include voice calls defined by 3GPP (3rd Generation Partnership Project) with Voice Call Continuity (VCC) specifications in order to describe how a voice call can be persisted, as a mobile phone moves between circuit switched and packet switched radio domains (3GPP TS 23.206).

The term data as utilized herein includes mobile broadband or wireless Internet access delivered through mobile phone towers over a communication channel as defined herein to computers, mobile phones, wireless devices, and other digital devices as defined herein using portable modems. Some mobile services allow more than one device to be connected to the Internet using a single cellular connection using a process called tethering.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Generally, companies that provide post-paid wireless services are wireless carriers or Mobile Network Operators (MNO) that maintain and control their own wireless networks. An MNO heavily relies on backend systems to address any provisional, billing, security, and data issues that might threaten the health of their networks. On the other hand, a Mobile Virtual Network Operator (MVNO) is a mobile operator that typically does not own its own frequency spectrum or have its own network infrastructure. MVNOs negotiate and enter into business agreements with third party wireless carriers or MNOs to purchase the right to use their networks for wireless services, which allow subscribers to connect a telephone to a carrier through a wireless telephone base station. The teachings of the disclosure herein are applicable to both MNO and MVNO implementations of a wireless services.

Aspects of the disclosure may include a server executing an instance of an application or software configured to accept requests from a client and giving responses accordingly. The server may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server may include peripheral devices that may allow information to be retrieved from an external source, and the result of operations saved and retrieved. The server may operate within a client-server architecture. The server may perform some tasks on behalf of clients. The clients may connect to the server through the network on a communication channel as defined herein. The server may use memory with error detection and correction, redundant disks, redundant power supplies and so on.

While the system and process have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A wireless device component testing system, the wireless device component testing system comprising:
   a SIM switcher device, wherein the SIM switcher device includes a controller, a plurality of relays, and a plurality of SIM boards;
   the SIM switcher device configured to connect to a wireless device, a computer system, and a plurality of SIM cards; and
   the SIM switcher device configured to support testing of the plurality of SIM cards in conjunction with the wireless device,
   wherein the wireless device component testing system is configured to implement testing for the plurality of SIM cards, the wireless device, and a wireless network,
   wherein the controller connects to each of the plurality of relays on a data/power line,
   wherein the data/power line comprises one or more of a single line and/or multiple lines, and
   wherein the controller is (i) responsive to at least one of the computer system, the wireless device, a user, or the wireless network and (ii) configured to perform at least one control function at each of the relays and the boards via a set of connections, the connections including at least one data signal and at least one power signal.

2. The wireless device component testing system according to claim 1 wherein the SIM switcher device is configured to connect to the plurality of SIM cards and selectively switch to and connect to one of the plurality of SIM cards for implementation with the wireless device for testing.

3. The wireless device component testing system according to claim 1 wherein the SIM switcher device is configured to switch to and implement a particular one of the plurality of SIM cards and thereafter the SIM switcher device is configured to switch to and implement another one of the plurality of SIM cards.

4. The wireless device component testing system according to claim 1,
   wherein a device under test (DUT) comprises at least one of the following: the plurality of SIM cards, the wireless device, and the wireless network; and
   wherein the wireless device component testing system is configured to operate, measure, test, analyze, and output a performance of the device under test (DUT).

5. The wireless device component testing system according to claim 4, wherein the wireless device component testing system is configured to apply various control signals, voltages, and/or currents to the device under test (DUT).

6. The wireless device component testing system according to claim 1, wherein the plurality of SIM boards are each configured to connect to one of the plurality of SIM cards.

7. The wireless device component testing system according to claim 1, wherein the controller enables one of the plurality of relays, one of the plurality of SIM boards, and one of the plurality of SIM cards.

8. The wireless device component testing system according to claim 1, further comprising:
   a data/power line that includes an end connector configured to connect to SIM card contacts of the wireless device; and
   the data/power line further connects to the plurality of SIM cards.

9. The wireless device component testing system according to claim 1, wherein the computer system, the wireless device, the wireless network, the SIM switcher device, operate to, measure, test, and analyze, a performance of the wireless device, the wireless network, and the plurality of SIM cards.

10. A wireless device component testing process, the wireless device component testing process comprising:
    providing a SIM switcher device wherein the SIM switcher device includes a controller, a plurality of relays, and a plurality of SIM boards;
    configuring the SIM switcher device to connect to a wireless device, a computer system, and a plurality of SIM cards; and
    configuring the SIM switcher device to support testing of the plurality of SIM cards in conjunction with the wireless device,
    wherein the wireless device component testing process is configured to implement testing for the plurality of SIM cards, the wireless device, and a wireless network,
    wherein the controller connects to each of the plurality of relays on a data/power line,
    wherein the data/power line comprises one or more of a single line and/or multiple lines, and wherein the controller is (i) responsive to at least one of the computer system, the wireless device, a user, or the wireless network, and (ii) configured to perform at least one control function at each of the relays and the boards via a set of connections, the connections including at least one data signal and at least one power signal.

11. The wireless device component testing process according to claim 10 further comprising configuring the SIM switcher device is to connect to the plurality of SIM cards and selectively switch to and connect to one of the plurality of SIM cards for implementation with the wireless device for testing.

12. The wireless device component testing process according to claim 10 further comprising configuring the SIM switcher device is to switch to and implement a particular one of the plurality of SIM cards and thereafter the SIM switcher device is configured to switch to and implement another one of the plurality of SIM cards.

13. The wireless device component testing process according to claim 10,
wherein a device under test (DUT) comprises at least one of the following: the plurality of SIM cards, the wireless device, and the wireless network; and
wherein the wireless device component testing process is configured to operate, measure, test, analyze, and output a performance of the device under test (DUT).

14. The wireless device component testing process according to claim 13, wherein the wireless device component testing process is configured to apply various control signals, voltages, and/or currents to the device under test (DUT).

15. The wireless device component testing process according to claim 10, wherein the plurality of SIM boards are each configured to connect to one of the plurality of SIM cards.

16. The wireless device component testing process according to claim 10, wherein the controller enables one of the plurality of relays, one of the plurality of SIM boards, and one of the plurality of SIM cards.

17. The wireless device component testing process according to claim 10, further comprising:
a data/power line that includes an end connector configured to connect to SIM card contacts of the wireless device; and
the data/power line further connects to the plurality of SIM cards.

18. The wireless device component testing process according to claim 10, wherein the computer system, the wireless device, the wireless network, the SIM switcher device, operate to, measure, test, and analyze, a performance of the wireless device, the wireless network, and the plurality of SIM cards.

* * * * *